(12) United States Patent
Drake

(10) Patent No.: US 6,979,175 B2
(45) Date of Patent: Dec. 27, 2005

(54) DOWNSTREAM WIND TURBINE

(76) Inventor: Devon Glen Drake, P.O. Box 691, Reedsville, WV (US) 26547

( * ) Notice: Subject to any disclaimer, the term of this patent is extended or adjusted under 35 U.S.C. 154(b) by 101 days.

(21) Appl. No.: 10/827,283

(22) Filed: Apr. 20, 2004

(65) Prior Publication Data

US 2004/0197188 A1     Oct. 7, 2004

Related U.S. Application Data

(63) Continuation-in-part of application No. 10/271,982, filed on Oct. 17, 2002, now abandoned.

(51) Int. Cl.⁷ .............................................. F03D 11/04
(52) U.S. Cl. ...................................... 416/11; 416/148
(58) Field of Search ........................ 416/11, 131, 141, 416/155.9, 10, 117, 148, 40–41, 13, 176, 416/135, 16, 142, 4.3, 4.5, 126, 908

(56) References Cited

U.S. PATENT DOCUMENTS

| | | | |
|---|---|---|---|
| 4,297,075 A | 10/1981 | Jacobs et al. | |
| 4,333,018 A | 6/1982 | Bottrell | |
| 4,352,629 A | 10/1982 | Cheney, Jr. | |
| 4,435,646 A | 3/1984 | Coleman et al. | |
| 4,449,889 A | 5/1984 | Belden | |
| 4,575,309 A | 3/1986 | Brown | |
| 4,894,554 A * | 1/1990 | Farmer | 290/55 |
| 5,213,470 A | 5/1993 | Lundquist | |
| 5,570,859 A | 11/1996 | Quandt | |
| 6,132,172 A | 10/2000 | Li | |

* cited by examiner

Primary Examiner—Edward K. Look
Assistant Examiner—Nathan Wiehe
(74) Attorney, Agent, or Firm—Wood, Ngo & Eisenberg, PLLC

(57) ABSTRACT

A downstream wind turbine for converting wind energy into electrical energy. In a preferred embodiment the downstream wind turbine adapted to respond to high winds and gyroscopic precession. The downstream wind turbine comprises a support tower; a yaw bearing attached to the support tower; a support frame operably linked to the bearing; at least one swing arm with one end pivotally attached to the support frame; an elongated carry member pivotally attached to the other end of the swing arm; a wind driven energy conversion system balanced on and attached to the carry member so that the carry member is biased to maintain an approximately horizontal orientation with respect to the support frame and in response to wind proportionally swings downstream, and which responds to gyroscopic precession forces by tilting up or down; and a governor device for modifying at least one dynamic characteristic of the turbine.

16 Claims, 15 Drawing Sheets

DOWNSTREAM WIND TURBINE

CROSS-REFERENCE TO RELATED APPLICATIONS

The present application is a continuation-in-part of U.S. patent application Ser. No. 10/271,982 filed on Oct. 17, 2002, now abandoned; patent application Ser. No. 10/271,982 is incorporated by reference herein in its entirety.

STATEMENT REGARDING FEDERALLY SPONSORED RESEARCH OR DEVELOPMENT

Not Applicable.

BACKGROUND OF THE INVENTION

This invention relates to a wind turbine for generating electrical power.

Conventional power generating plant, such as coal and oil fired plant, use hydrocarbon fuels to generate electricity. Burning hydrocarbons both uses up valuable non-renewable resources and adds chemical pollutants to the environment. Thus there is a need to harness natural energy for conversion into electrical energy.

Natural energy sources include water, in the form of hydroelectric power, and wind. Hydroelectric power is available in areas with favorable geography such as found in Norway where hydroelectric power makes a significant contribution to Norway's energy needs.

Wind turbines are used to convert wind energy into electrical energy that is typically fed into the grid. However, wind turbines are vulnerable to severe damage caused by high winds. Specifically, in high winds a wind turbine may experience a run-away incident in which the blades of the wind turbine rotate at a destructive rate. Various expensive and complicated design solutions have been applied to wind turbines to avoid run-away incidents.

In one type of wind turbine the rotation rate of rotor blades is monitored and after a predetermined point a control system applies a braking force to the rotor assembly to inhibit or stop the rotation of the rotor blades. Since the brakes are typically applied when the rotor blades are near their maximum permitted rate of revolutions, failure in the braking system can lead to a run-away incident and the destruction of the wind turbine.

The American farm windmill design limits the effect of high winds by using a tail vane which, when triggered by wind speeds exceeding its maximum set point, turns 90 degrees with respect to the turbine shaft in order to rotate the turbine out of the wind. The 4-arm Dutch windmill relies on manual furling of canvas sails to accomplish the same effect. While such design solutions may help to avoid run-away incidents, rotating the turbine completely out of the wind stops the conversion of wind energy into electrical energy.

U.S. Pat. No. 4,333,018 issued Jun. 1, 1982 to Bottrell, describes a downstream wind turbine that converts wind energy into controlled wind turbine torque for generating electrical energy. Like other downstream wind turbines, the '018 wind turbine is normally oriented downwind of the turbine tower, so that wind forces acting on the wind turbine create a drag which keeps the wind turbine directed into the wind, but downstream from the turbine tower. The '018 wind turbine comprises a yaw control vane which is used to partially rotate the wind turbine out of a high wind to maintain a constant turbine torque. Rotating the turbine partially out of the wind creates additional stresses on the wind turbine.

U.S. Pat. No. 4,449,889 issued May 22, 1984 to Belden, describes a windmill having a plurality of blades generally transverse to an upstanding rotor shaft. The blades have an airfoil cross-sectional shape and are oriented with a negative angle of attack, thereby allowing the leading edge of the airfoil to turn into the wind. The windmill preferably has a tilting assembly that tilts the rotor shaft and blades at an angle dependent upon the velocity of the wind. As the wind velocity increases the rotor shaft is automatically tilted into a vertical position by the control tail. This automatic tilting of the windmill provides automatic control of the rotor speed. The rotor blades are preferably pivotally connected to the rotor shaft. Rotating the turbine partially out of the wind creates additional stresses on the wind turbine; rotating the turbine completely out of the wind stops conversion of wind energy into electrical energy.

U.S. Pat. No. 4,352,629 issued Oct. 5, 1982 to Cheney, Jr., describes a wind turbine of the type having an airfoil blade mounted on a flexible beam and a pitch governor which selectively, torsionally twists the flexible beam in response to wind turbine speed thereby setting blade pitch. A limiter restricts unwanted pitch change at operating speeds due to torsional creep of the flexible beam. The limiter allows twisting of the beam by the governor under excessive wind velocity conditions to orient the blades in stall pitch positions, thereby preventing run-away operation of the turbine. In the preferred embodiment, the pitch governor comprises a pendulum which responds to changing rotor speed by pivotal movement, the limiter comprising a resilient member which engages an end of the pendulum to restrict further movement thereof, and in turn restrict beam creep and unwanted blade pitch misadjustment. The '629 solution is complex and relies on twisting a flexible beam, which must be designed to cope with such twisting thereby adding to manufacturing cost.

In addition to run-away issues, gyroscopic precession can cause severe loads on wind turbines. Precession is a phenomenon that effects rotating bodies, wherein an applied force is manifested 90 degrees later in the direction of rotation from where the force was applied. A change in wind direction causes precession, wherein the rotor blades (which form part of the rotor assembly) experience forces that cause them to tilt upward or downward depending on the change in wind direction and direction of rotation of the blades. For example, with respect to a downstream wind turbine, if the rotor blades are rotating clockwise and the wind direction causes the rotor assembly to turn to the right with respect to original wind direction, the rotor blades will want to tilt downwards. If the rotor blades are rotating clockwise and the wind direction causes the rotor assembly to turn to the left with respect to the original wind direction then the rotating blades will want to tilt upwards.

Wind turbines not designed to handle precession risk serious damage. Various solutions have been applied to counter precession. One solution relies on using turbines that always point in one direction. Such design solutions are at best limited in scope and are not suitable for most areas where wind direction is variable.

Some wind turbines are designed to respond slowly to wind direction changes thereby limiting the gyroscopic precession forces. Such systems require gears and drive mechanisms to make controlled slow turns. Such mechanisms add to manufacturing and maintenance costs; in addition, a drive motor might be required to drive the mechanism. Wind turbines fitted with such mechanisms are also less efficient since they are necessarily slow in responding to changes in wind direction.

Some manufacturers of wind turbines deal with precession effects by preventing tilting of the rotor assembly. Such wind turbines still experience the up and down tilt forces in the rotor assembly but incorporate, for example, very strong support towers that are able to withstand the precession forces transmitted to the support tower from the rotating blades. Such wind turbines are very expensive to build since they require a considerable amount of strengthening and use of expensive parts. In addition, the rotor blades will experience severe flexing forces necessitating expensive development and high manufacturing costs.

In another design solution, the rotor attached to the blades is allowed to teeter separately from the rest of the rotor assembly thereby at least partly isolating the support tower from the effects of gyroscopic forces. Teetering blades can strike the support tower destroying the turbine.

None of the above inventions and patents, taken either singly or in combination, is seen to describe the instant invention as claimed. Thus a wind turbine solving the aforementioned problems is desired.

SUMMARY OF THE INVENTION

A downstream wind turbine, comprising: a support tower; a yaw bearing attached to the support tower; a support frame operably linked to the bearing; at least one swing arm with one end pivotally attached to the support frame; an elongated carry member pivotally attached to the other end of the swing arm; a wind driven energy conversion system balanced on and attached to the carry member so that the carry member is biased to maintain an approximately horizontal orientation with respect to the support frame and in response impacting on the blades of the turbine proportionally swings downstream; a governor device for modifying at least one dynamic characteristic of the turbine; and a means for measuring the amount of downstream swing experienced by the carry member and simultaneously or nearly simultaneously transmitting this information to the governor device for modifying at least one dynamic characteristic of the turbine.

Accordingly, it is a principal object of the invention to provide a wind turbine.

It is another object of the invention to provide a wind turbine that is responsive to high winds.

It is further object of the invention to provide a wind turbine that is responsive to gyroscopic precession.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a downstream wind turbine for converting wind energy into electrical energy and, more specifically, to a downstream wind turbine 100 adapted to respond to high winds and gyroscopic precession.

Figure 1:
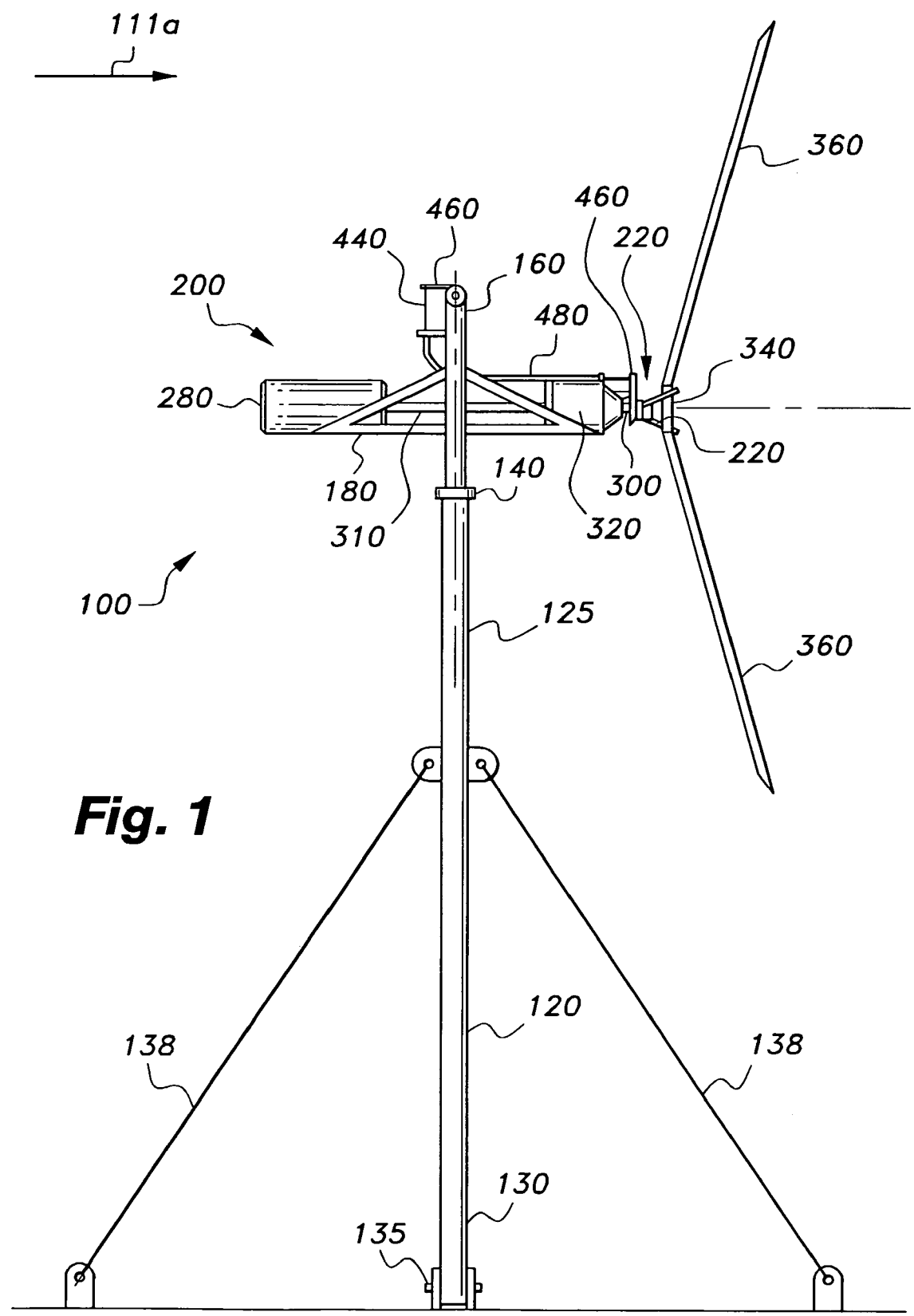
FIG. 1 is side view of a downstream wind turbine that is operating in normal wind conditions according to the present invention.

FIG. 1 is side view of a downstream wind turbine 100 according to the present invention. The downstream wind turbine 100 is shown operating in ambient wind conditions. Wind condition and direction are represented by alpha-numeral "111*a*".

Still referring to FIG. 1, the downstream wind turbine 100 comprises an approximately vertical support tower 120 having a top 125 and bottom 130, a yaw bearing 140 attached to the top 125 of the tower 120, a support frame 160, an elongated carry member 180 pivotally attached to the support frame 160, wherein the carry member is free to swing away and downstream from the support tower 100 or support frame 160 (see FIG. 2A), a wind driven energy conversion system 200 balanced on and firmly attached to the carry member 180, a governor device (such as a blade pitch regulator 220) for modifying at least one dynamic characteristic of the energy conversion system 200, and a downstream swing-monitoring device (such as a pull cable system, discussed below) for measuring the amount of downstream swing experienced by the carry member 180 and energy conversion system 200 attached thereto.

Still referring to FIG. 1, the bottom 130 of tower 120 is optionally attached to a hinge 135 and hence to the ground for lowering and raising the wind turbine 100. The optional hinge 135 may be firmly attached to a base or firm ground such as a layer of stable concrete. Optional guy cables 138 may be used to stabilize the tower 120 as shown in FIG. 1.

The energy conversion system 200 comprises an electric generator or alternator 280, a low speed shaft 300, a high speed shaft 310, a transmission system 320, and a rotor head 340 attached to at least two aerofoil blades 360. It will be understood that the component parts found in the energy conversion system 200 may vary in order listed or type of components as is well understood in the art of electric power generation from wind energy. The energy conversion system 200 is balanced on and firmly attached to the carry member 180 so that the carry member. 180 is biased to maintain an approximately horizontal orientation with respect to the support frame 160. It will be understood by persons of ordinary skill in the art that the component parts, and arrangement thereof, that make up the energy conversion system 200 can vary; for example, the transmission 320 may be placed at a different position relative to the generator 280 or the carry member 180 thereby impacting on the lengths of the shafts 300 and 310.

Figure 2A:
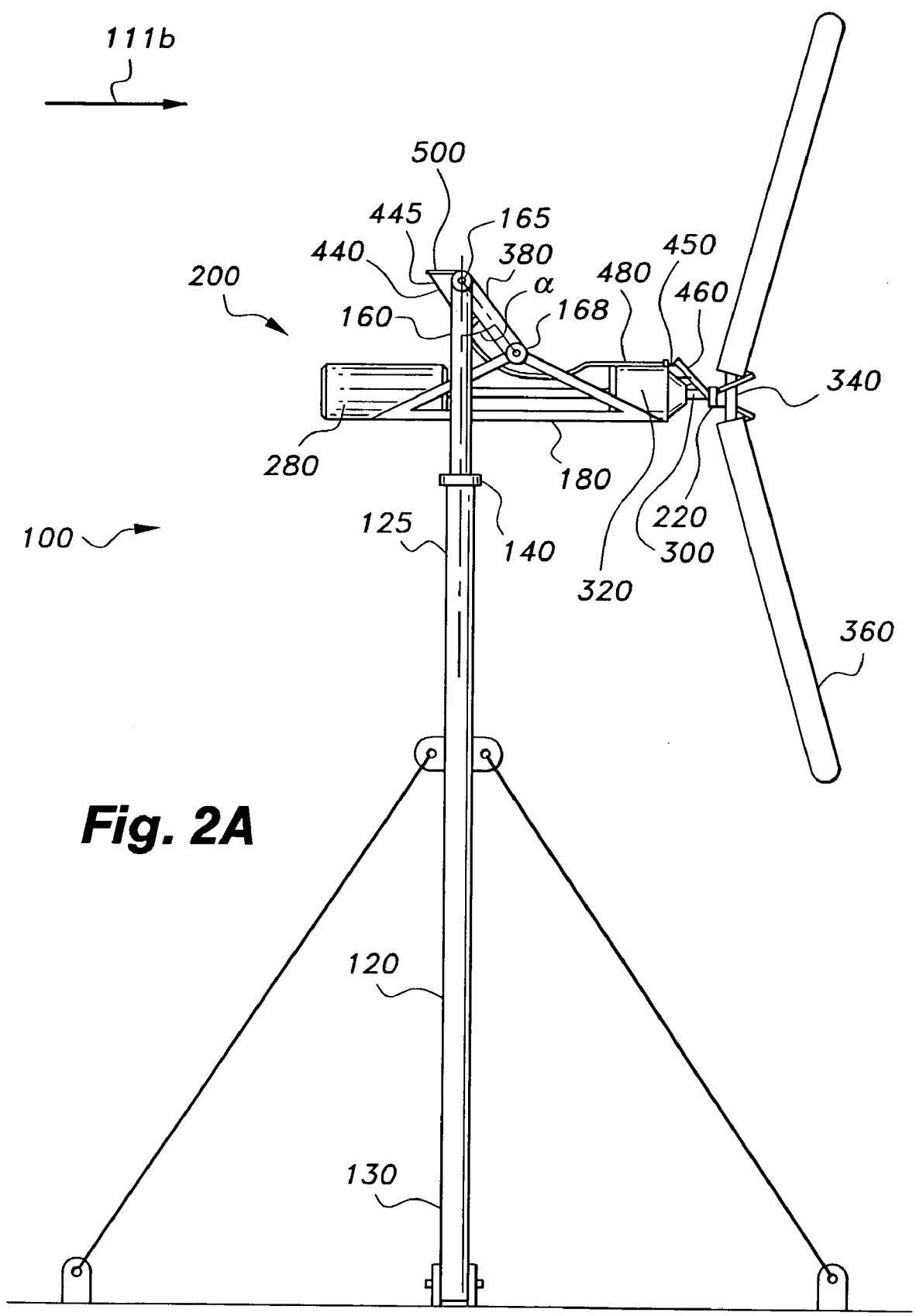
FIG. 2A is side view of the wind turbine of FIG. 1 that is operating in high wind conditions according to the present invention.
Figure 2B:
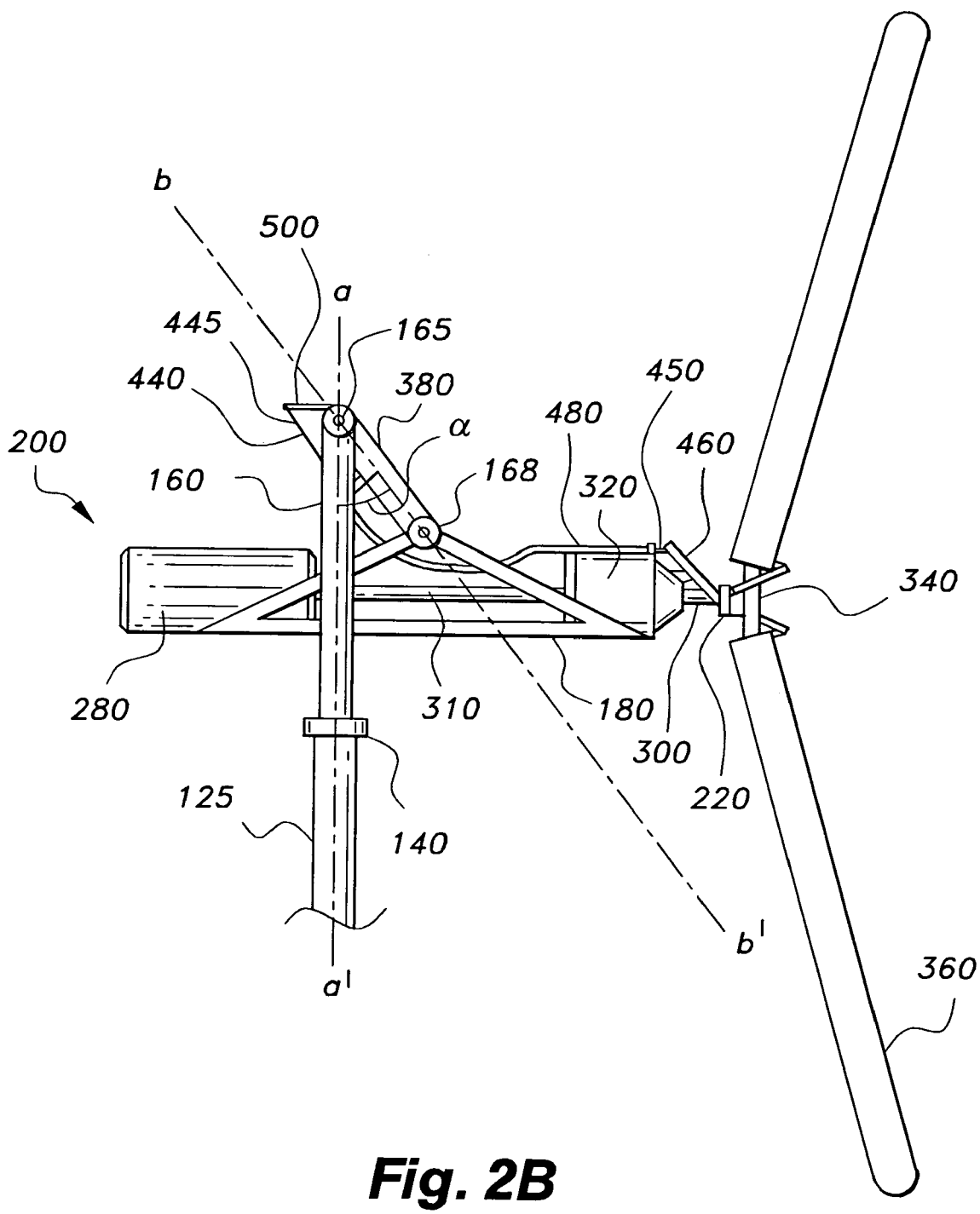
FIG. 2B is close up side view of the wind turbine of FIG. 2A showing the downstream swing angle α.

FIGS. 2A and 2B are side views of downstream wind turbine 100 according to the present invention. The downstream wind turbine 100 is shown operating in high wind conditions. Wind direction represented by numeral "111b". High winds 111b incident on the aerofoil blades 360 are transmitted to the carry member 180 (and energy conversion system 200 attached to the carry member 180) and cause the carry member 180 to swing downstream from the support frame 160 or tower 120 as shown in FIG. 2A, and summarized in FIG. 6. The degree of downstream swing is proportional to the ferocity of the wind incident on the aerofoil blades 360.

The downstream swing, as depicted in FIG. 2A, occurs simultaneously or almost simultaneously and in synchrony with the high wind incident on the aerofoil blades 360. When the wind subsides the force of gravity returns the carry member back to its normal operating position as depicted in FIG. 1. Thus, the force of gravity constantly counteracts the amount of downstream swing such that the downstream swing is proportional to the power of the wind 111b incident on the aerofoil blades 360.

Figure 3A:
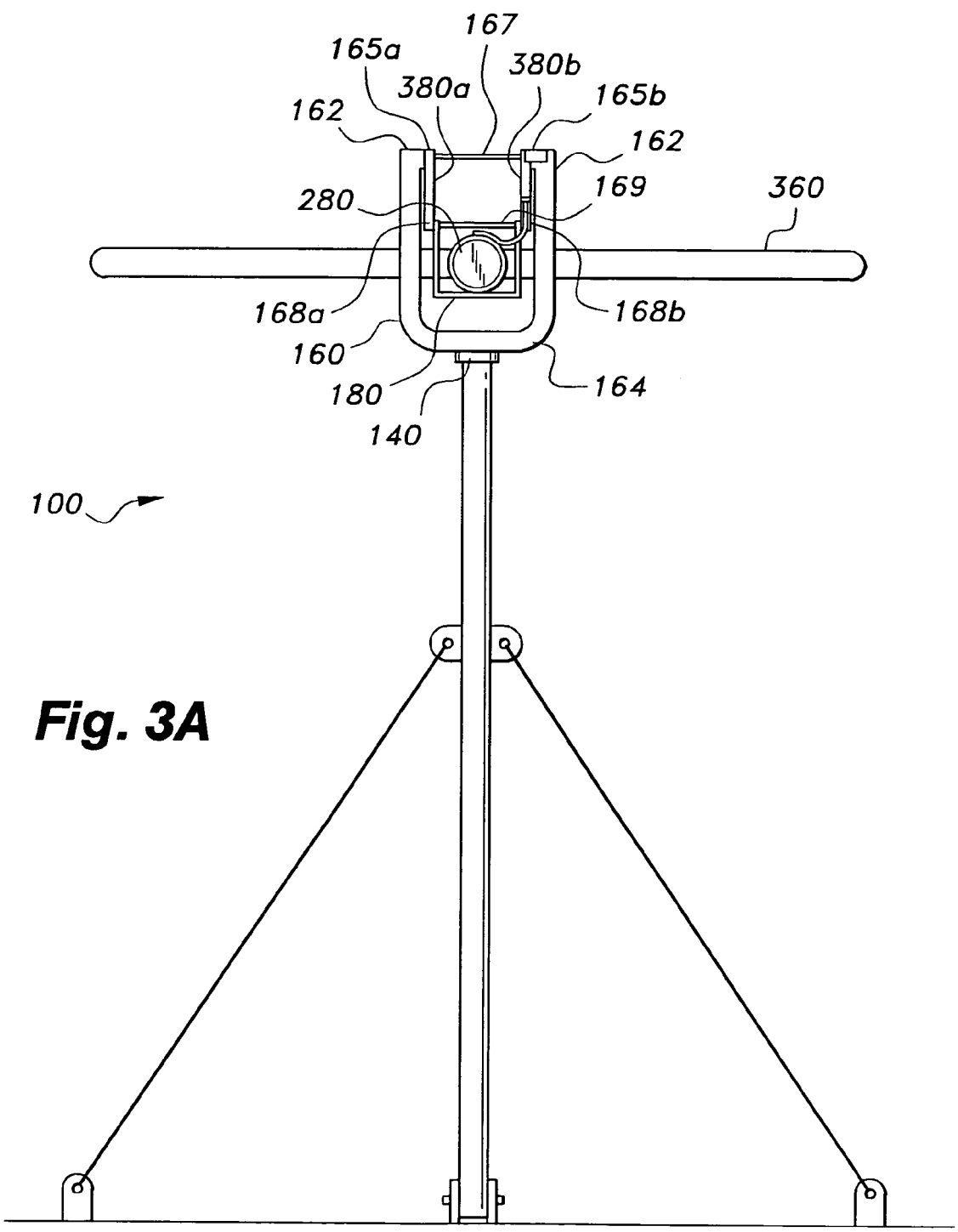
FIG. 3A is a front view of the wind turbine of FIG. 1.

For convenience herein, the support frame 160 is labeled with a top portion 162 and a bottom portion 164 (see FIG. 3A). The bottom 164 is operably linked to the yaw bearing 140 such that the support frame 160 is free to yaw about a horizontal axis. The top 162 need not be continuous; for example, the support frame 160 can resemble a generally planar U-shape as shown in FIG. 3A. As will be understood the exact form of the support frame 160 may vary.

Figure 3B:
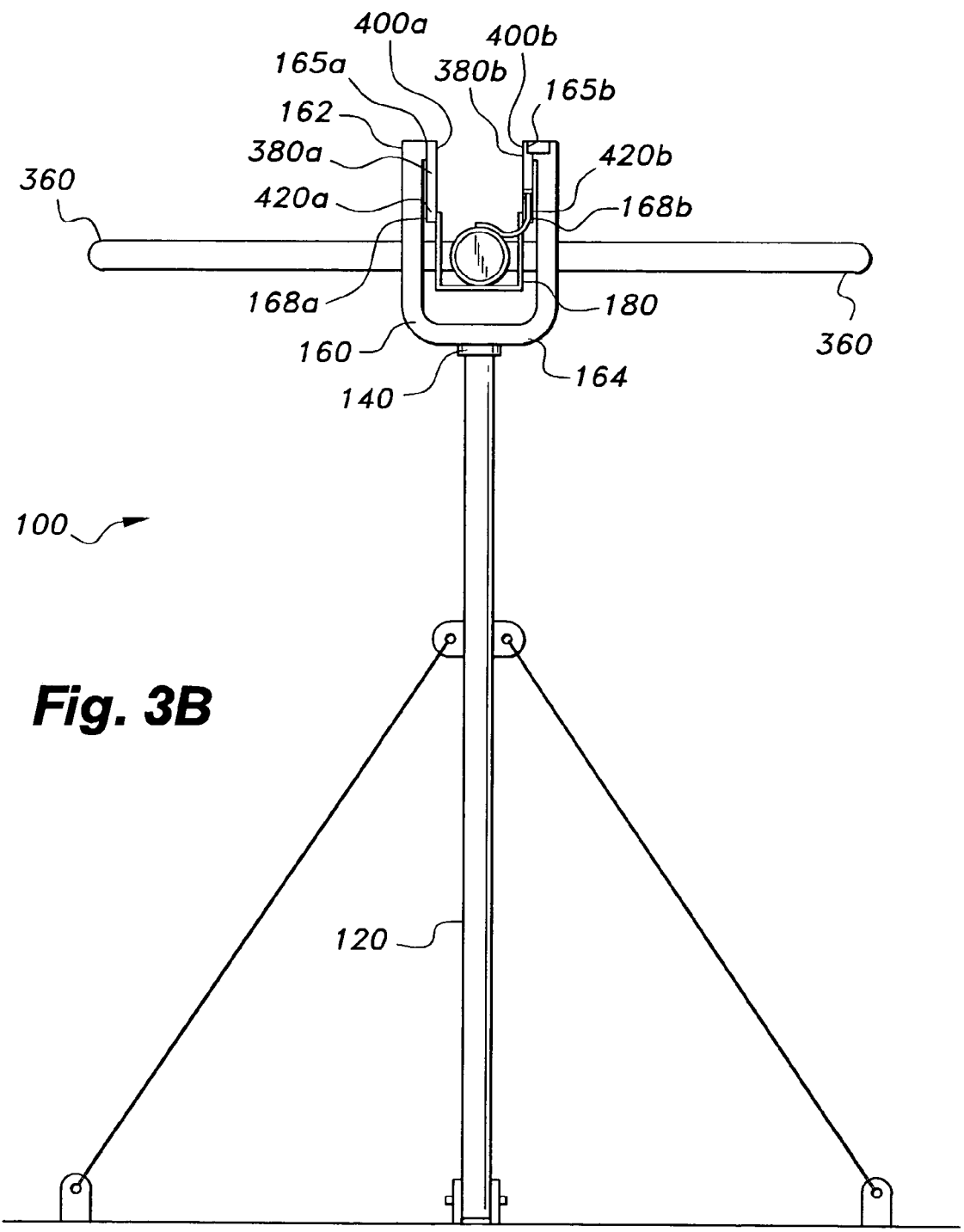
FIG. 3B is a front view of an alternative embodiment of the wind turbine according to the present invention.

At least one swing arm 380 (shown as swing arm members 380a and 380b in FIGS. 3A and 3B) is pivotally attached by means of at least one pivot point 165 (shown as pivot points 165a and 165b in FIG. 3A) to the support frame 160. The pivot points 165a and 165b may form part of a first bearing shaft 167 as depicted in, for example, FIGS. 3A and 11. More specifically, each at least one swing arms 380 has first 400 and second 420 opposite ends (shown as 400a/400b, and 420a/420b, respectively, in FIG. 3B), the first opposite end 400 is pivotally attached at pivot point 165 (or pivot points 165a and 165b) to the support frame 160 such that the at least one swing arm 380 is free to swing downstream and back at a perpendicular angle with respect to the support frame 160. The second opposite end 420 is pivotally attached at pivot point 168 (shown as pivot points 168a and 168b in FIGS. 3A and 3B) to the carrier member 180. The pivot points 168a and 168b may form part of a second bearing shaft 169 as depicted in FIG. 3A.

The carry member 180 is at least partly accommodated inside at a perpendicular angle with respect to the support frame 160 (see, e.g., FIGS. 1 and 3A). It is preferred that there are two swing arms 380, but the number of swing arms may vary. For example, a single swing arm 380 may suffice as shown in FIG. 3C.

Figure 3C:
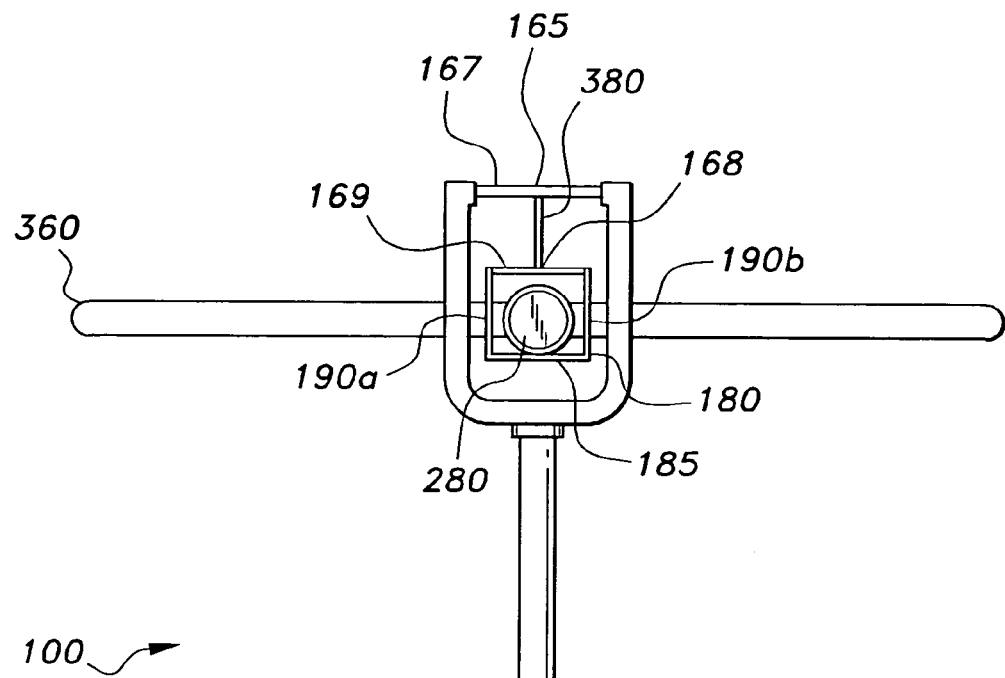
FIG. 3C is a front view of an alternative embodiment of the wind turbine according to the present invention.
Figure 3C:
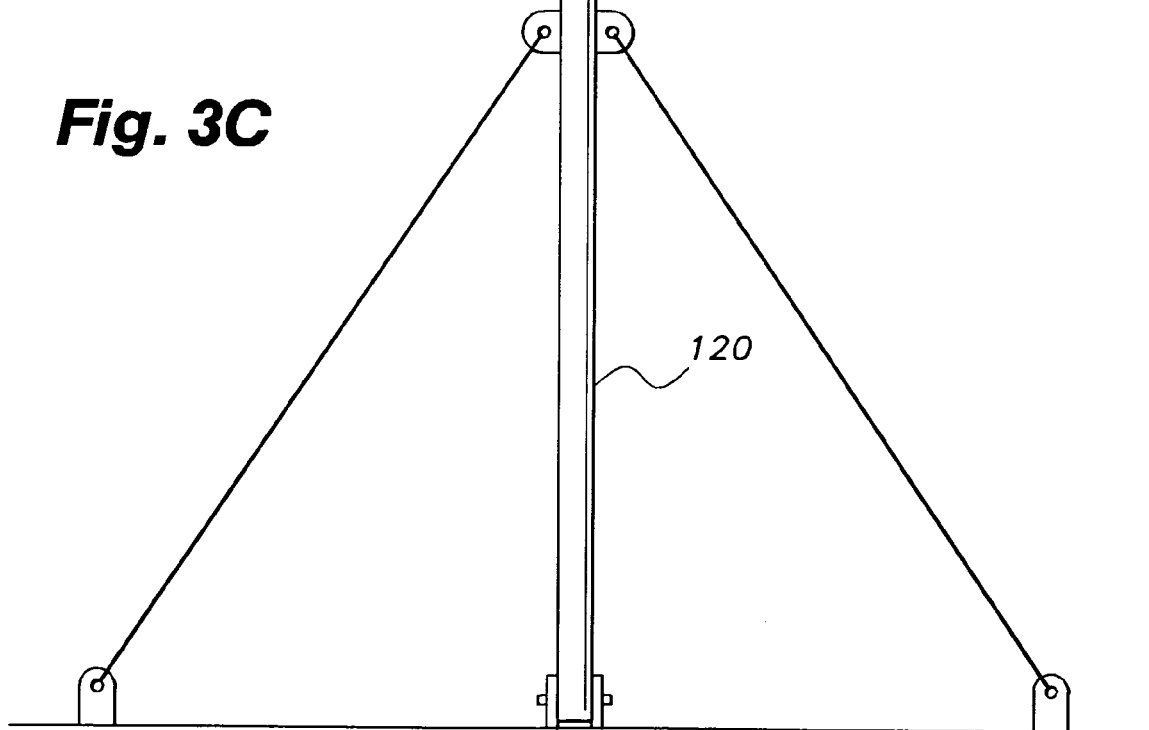

In FIG. 3C, the carry member 180 is shown comprising a bottom 185, and opposite lateral sides 190a and 190b. The energy conversion system 200 is attached to the bottom 185. However, it should be understood that the carry member 180 might vary in form and structure.

The energy conversion system 200 is balanced on and firmly attached to the carry member 180 so that in ambient or ordinary wind conditions 111a the carry member 180 is biased to maintain a substantially horizontal orientation with respect to the support frame 160 (see FIG. 1). However, in high wind conditions 111b, wherein the high wind 111b is incident on the blades 360, the carrier member 180 responds to the wind 111b by proportionally swinging and holding a position downstream from the support frame 160 and tower 120 (see FIG. 2A).

The support frame 160 and at least one swing arm 380 respectively possess central longitudinal axes: a–a' and b–b' (see FIG. 2B). The angle of downstream swing is represented by the alpha labels "α" and as "α'" and "α", i.e. the angle between longitudinal mid-axes a–a' and b–b'. As discussed above, the downstream position and degree of downstream swing varies with the power of the wind 111b. When the high power wind 111b is very severe, the at least one swing arm 380 swings downstream until it is approximately horizontal with an α angle of about 90° (in FIG. 2A, the swing arm 380 is at a downstream angle of about 45° with respect to the planar support frame 160). Thus, the degree of downstream swing is represented by the degree of swing experienced by the swing arm 380, which varies between a starting point at an approximately vertical orientation (i.e., an α angle of about 0°) with no wind or very low wind conditions and an approximately horizontal orientation (i.e., an α angle of about 90°) in very severe wind conditions. Thus, the swing arm 380 can swing downstream through an angle range of about 0° to about 90°. However, it should be understood that the swing arm 380 might be configured to swing between different starting and end points and through a different swing angle.

The amount of downstream swing experienced by the swing arm 380 is synonymous with the amount of downstream swing experienced by the carrier member 180. Thus, monitoring the swing arm 380 (i.e. α angle) would provide downstream swing data on the carrier member 180. Monitoring the downstream swing provides a basis for adjusting a dynamic characteristic of the wind turbine 100.

The amount of downstream swing experienced by the carry member 180 (or swing arm 380) is monitored by a downstream swing monitoring device, which transmits or operably communicates the degree of downstream swing to a governor device for modifying at least one dynamic characteristic of the downstream wind turbine 100. The form of the monitoring device may vary and take the form of an electronic device or a mechanical device, or a combination of an electronic device and a mechanical device to measure the downstream swing action of the carrier member 180. The form of the governor device may vary and take the form of an electronic device or a mechanical device, or a combination of an electronic device and a mechanical device to control one or more dynamic characteristics of the wind turbine 100.

In FIG. 2A, the downstream swing-monitoring device takes the form of a pull cable system that comprises a pull cable 440 attached to a control lever 460. Part of the cable 440 is encased in a cable guide tube 480. More specifically, the pull cable 440 has two opposite ends 445 and 450, end 445 is attached to a fixed guide arm 500 and the other end 450 is attached to the control lever 460. The control lever 460 is attached to a governor device, which in this example is a blade pitch regulator 220. The pitch regulator 220 is attached to part of the energy conversion system 200 at a point near the rotor head 340.

Pitch regulators and blades capable of varying blade pitch are well known in the art. For example, U.S. Pat. No. 4,352,629 (Cheney, Jr., issued Oct. 5, 1982) describes a wind turbine blade mounted on a flexible beam and a pitch governor or regulator that selectively twists the flexible beam to vary pitch. The Cheney '629 patent is herein incorporated by reference in its entirety.

The cable end 450 pulls on the control lever 460 when the carry member 180 swings out from the support frame 160. The control lever 460 controls the pitch regulator 220 (see FIG. 2A). The pitch regulator 220 controls the pitch of the at least two blades 360. Thus, the governor device shown in FIG. 2A is a pitch regulator 220 that controls a dynamic characteristic of the wind turbine 100, namely the pitch of the blades 360.

When the carry member 180 swings downstream this causes tension in the pull cable 440. Thus, the amount of swing is monitored mechanically and in real time and this information is inherently transmitted via the cable 440 to the governor device, which in the exemplary example discussed here is in the form of control lever 460 attached to pitch regulator 220. The pitch regulator 220 alters the pitch of the blades 360 almost simultaneously and in proportion to the downstream swing of the carry member 180.

In normal wind conditions the pull cable 440 is in a relaxed mode and does not pull on the control lever 460 (see FIG. 1); in this condition the pitch regulator 220 does not alter the pitch of the blades, allowing them to remain in their most efficient pitch configuration in which the maximum amount of wind energy is captured to rotate the blades 360. In high winds the pull cable 440 pulls on the control lever 460 and causes the pitch regulator 220 to alter the pitch of the blades 360 to their least efficient configuration with respect to capturing the wind energy, thus limiting the rotation of the blades 360 in a high wind condition thereby preventing a run-away condition.

The governor device could be a braking device to regulate the rotation rate of the blades 360. For example, applying a brake to the transmission system 320. Alternatively, the governor device could be a blade tip pitch control device comprising an hydraulic actuator operably coupled to blade tips that are pivotable to a position in which they act as brakes to slow the wind turbine down (see, for example, U.S. Pat. No. 4,575,309 (Brown, issued Mar. 11, 1986; the Brown '309 is herein incorporated by reference in its entirety).

The governor device could be a mechanical device that causes the blades 360 to be moved out of the direction of a high wind by moving the blades on a horizontal axis or by causing the blades 360 to be moved vertically out of the wind as described in U.S. Pat. No. 4,449,889 (Belden, issued May 22, 1984; the Belden '889 is incorporated herein by reference in its entirety). Thus, it will be understood that the governor device could be any type of governor device that can alter a dynamic characteristic of the wind turbine such as blade pitch, blade tip pitch, and any form of device capable of creating drag such as a spoiler flap attached to a wind turbine blade as described in U.S. Pat. No. 5,570,859 issued Nov. 5, 1996 to Quandt; the Quandt '859 reference is herein incorporated by reference in its entirety. A governor device may incorporate or be operatively coupled to a brake that is in turn operably coupled to the rotor head 340, transmission system 320 or shafts 300/310; alternatively, a governor device may be coupled to a mechanism to move the blades 360 out of a high wind and so on.

Figure 4:
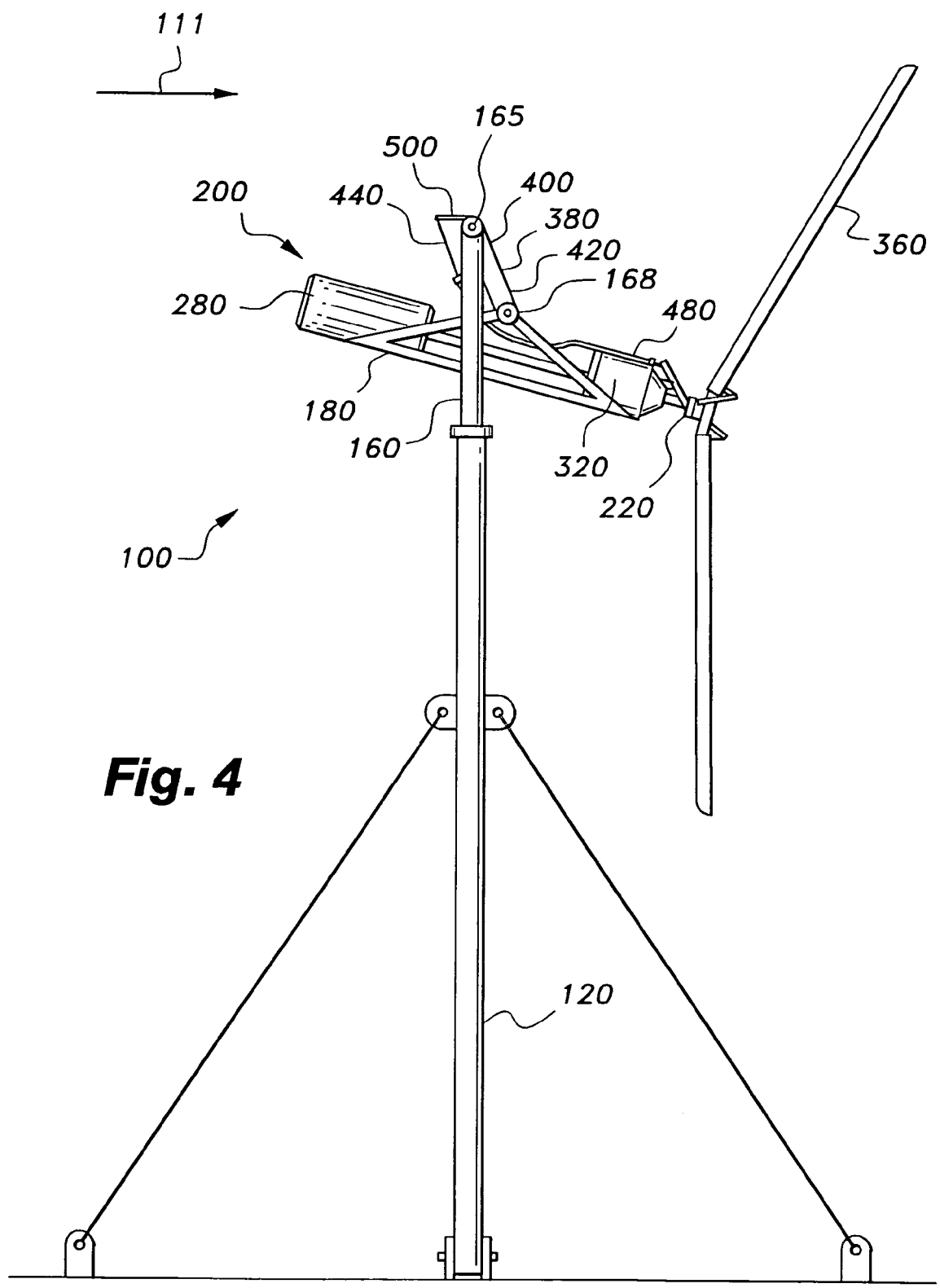
FIG. 4 is side view of the wind turbine of FIG. 1 that is tilting downwards in response to gyroscopic precession due to a change in wind direction.

FIGS. 2A and 2B show the approximately horizontal swing movement of the carry member 180, wherein the energy conversion system 200 acts as balancing ballast for maintaining the carry member 180 in an approximately horizontal orientation in the absence of gyroscopic precession forces. The energy conversion system 200 is balanced on and firmly attached to the carry member 180 so that the carry member is biased to maintain an approximately horizontal orientation with respect to the support frame 160 and in response to wind incident on the blades 360 proportionally swings downstream from the support frame 160. Gyroscopic forces are transferred from the rotating blades 360 to the carry member 180 via the rotor head 340, low speed shaft 300, and transmission system 320. The carrier member 180 tilts down or up in response to gyroscopic forces as shown respectively in FIGS. 4 and 5, and summarized in FIG. 7.

Figure 5:
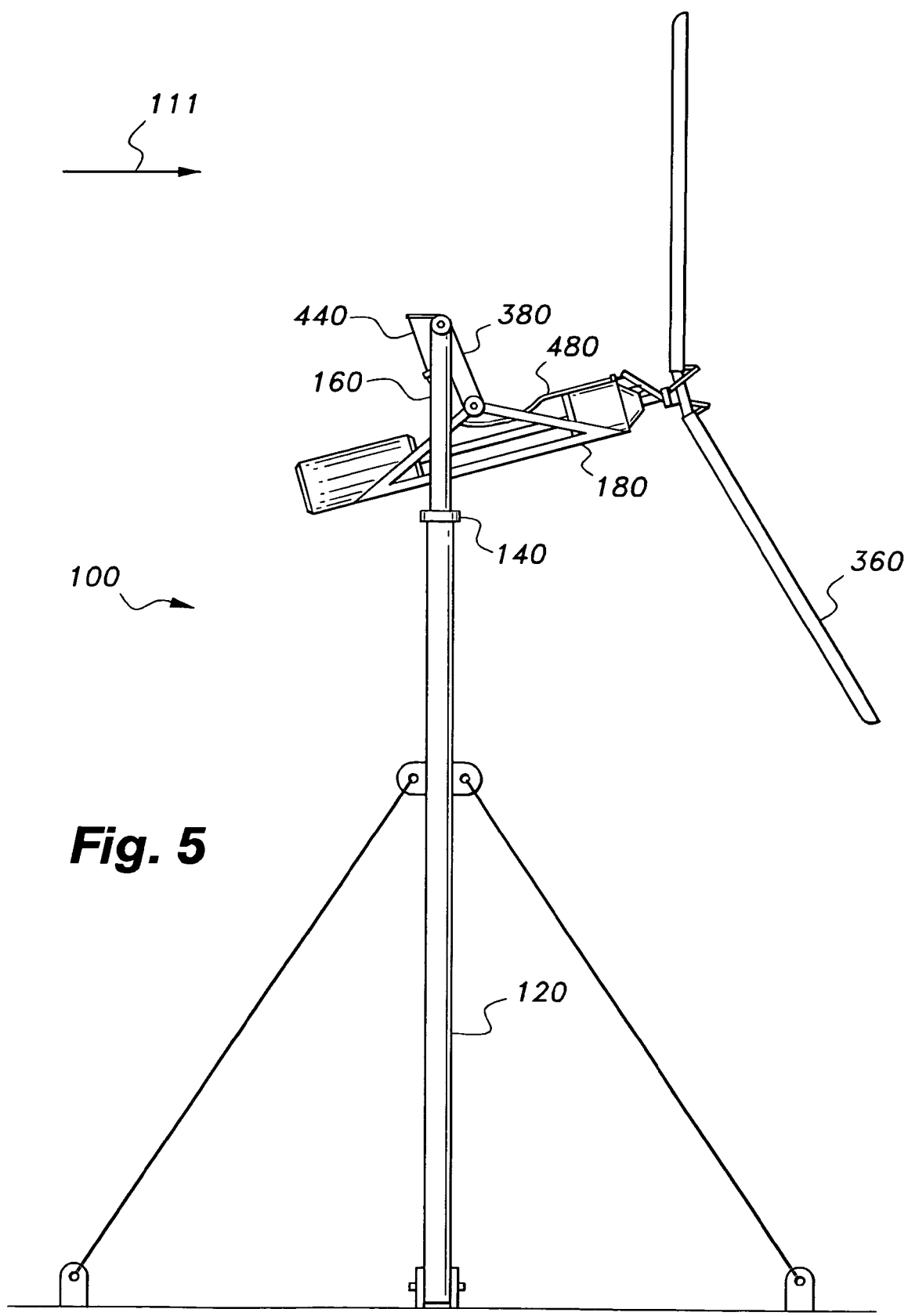
FIG. 5 is side view of the wind turbine of FIG. 1 that is tilting upwards in response to gyroscopic precession due to a change in wind direction.
Figure 6:
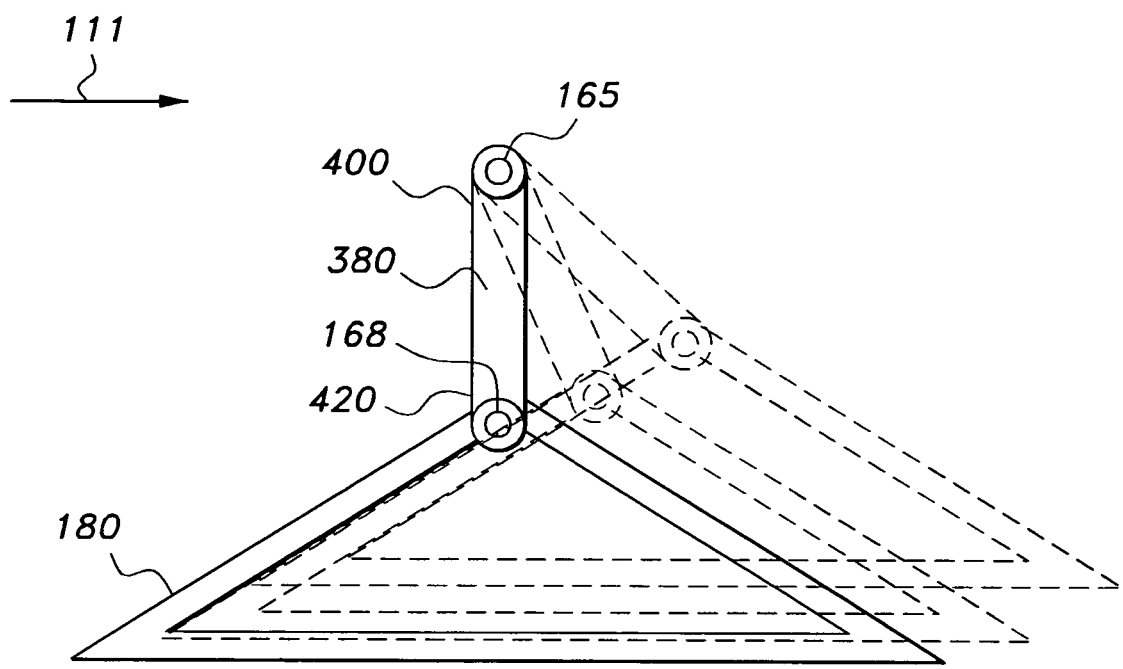
FIG. 6 shows a side view of a carry member in different positions during a downstream swing according to the present invention.

FIGS. 5 and 6 show how the at least one swing arm 380 and pivot points 165 and 168 also permit the carry member 180 to tilt up or down in response to gyroscopic forces transmitted from the blades 360 in response to changes in wind direction. For example, if the blades 360 are rotating clockwise with respect to the wind incident on the blades 360, and the wind changes direction to the right with respect to the rotating blades 360, the carrier member 180 will tilt downwards as the support frame 160 yaws to the right on the yaw bearing 140 to realign the energy conversion system 200 with the new wind direction thus assuring optimum conversion of wind energy into electrical energy.

FIG. 6 shows a side view of the carry member 180 in different positions during a downstream swing.

Figure 7:
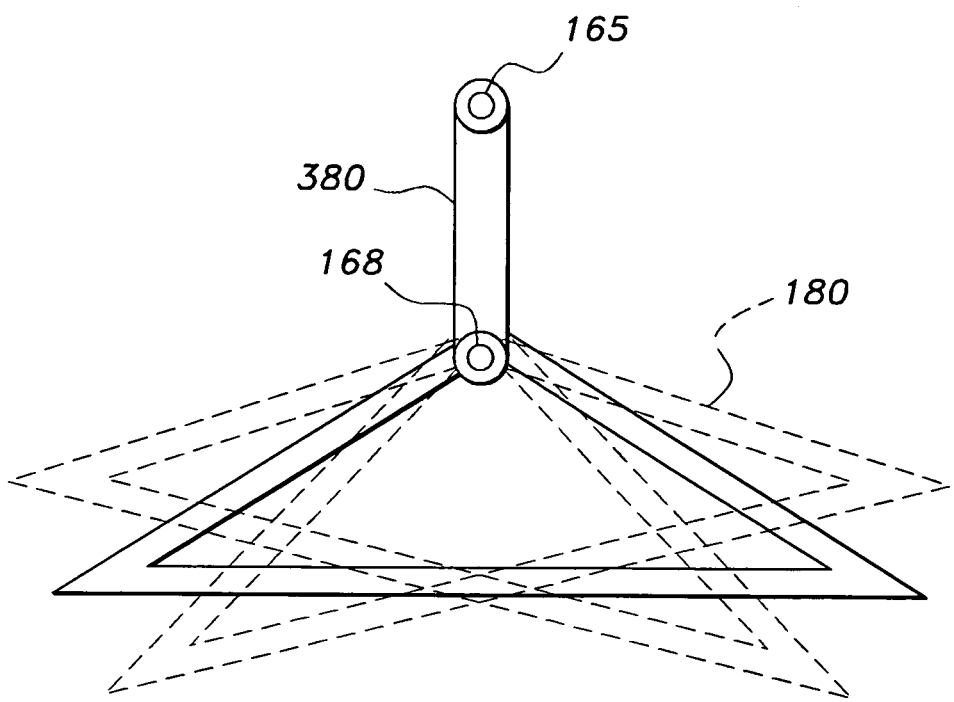
FIG. 7 shows a side view of a carry member in different positions during a gyroscopic precession event.

FIG. 7 shows a side view of the carry member 180 in different positions during a gyroscopic precession event, i.e. the carry member 180 is able to tilt up or down in response to a change in wind direction incident on the rotors 360.

Figure 8:
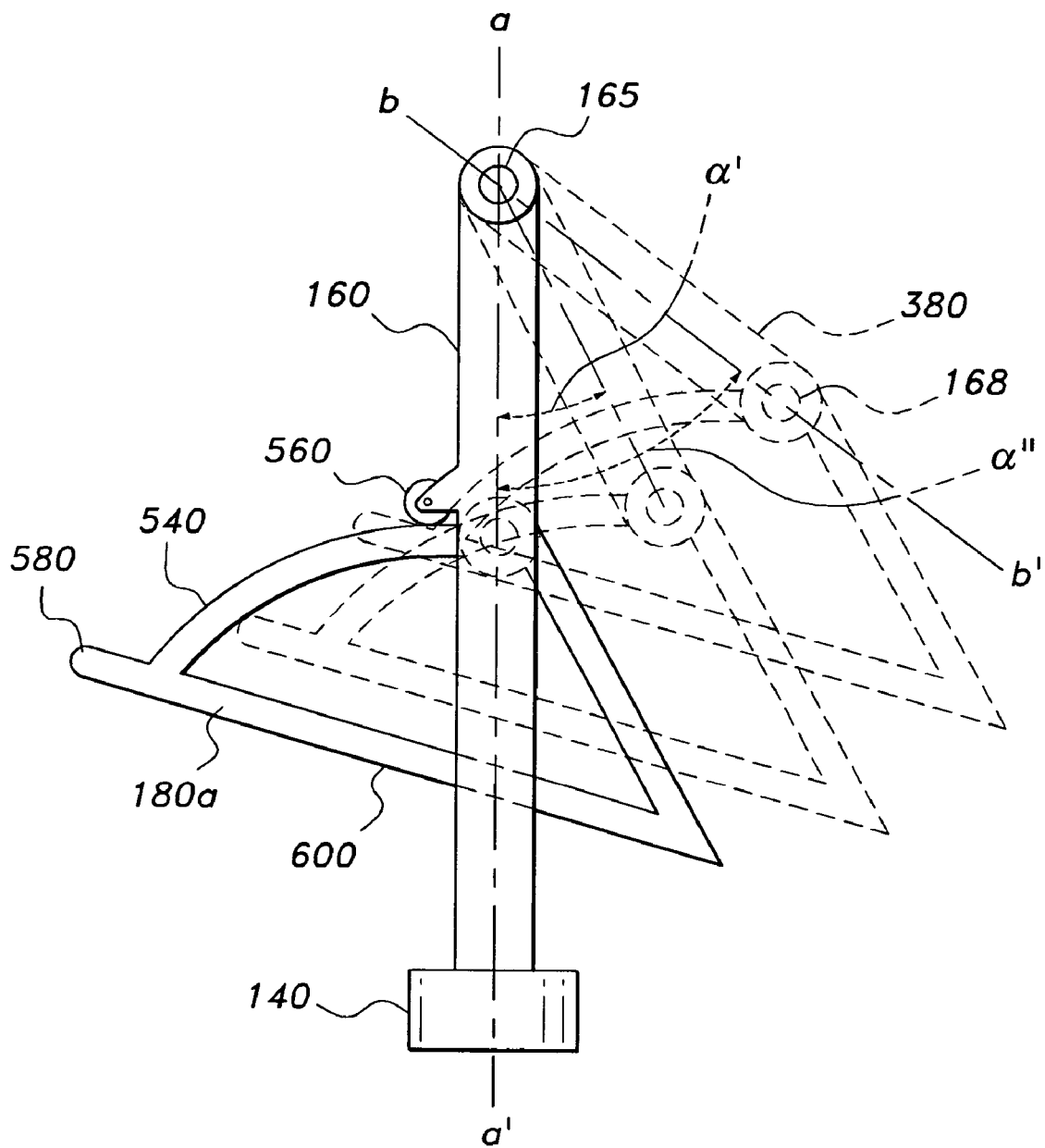
FIG. 8 shows side view of an alternative embodiment of the carry member according to the present invention.

FIG. 8 shows an alternative embodiment of the carry member 180 (represented by the alpha-numeric label "180a"). The carry member 180a comprises a curved glide 540 in operable contact with a roller 560. The curved glide 540 and roller 560 work in unison to limit the downward tilt of the carry member 180a; a stop 580, in the form of an extension of the bottom 600 of the carry member 180, prevents over-tilting of the carry member 180 in response to precession forces. The stop 580 abuts against the roller 560 at a predetermined maximum angle of downward tilt of the carry member 180. The predetermined maximum angle of downward tilt is selected to ensure that there is no contact between the blades 360 and the tower 120.

Figure 9:
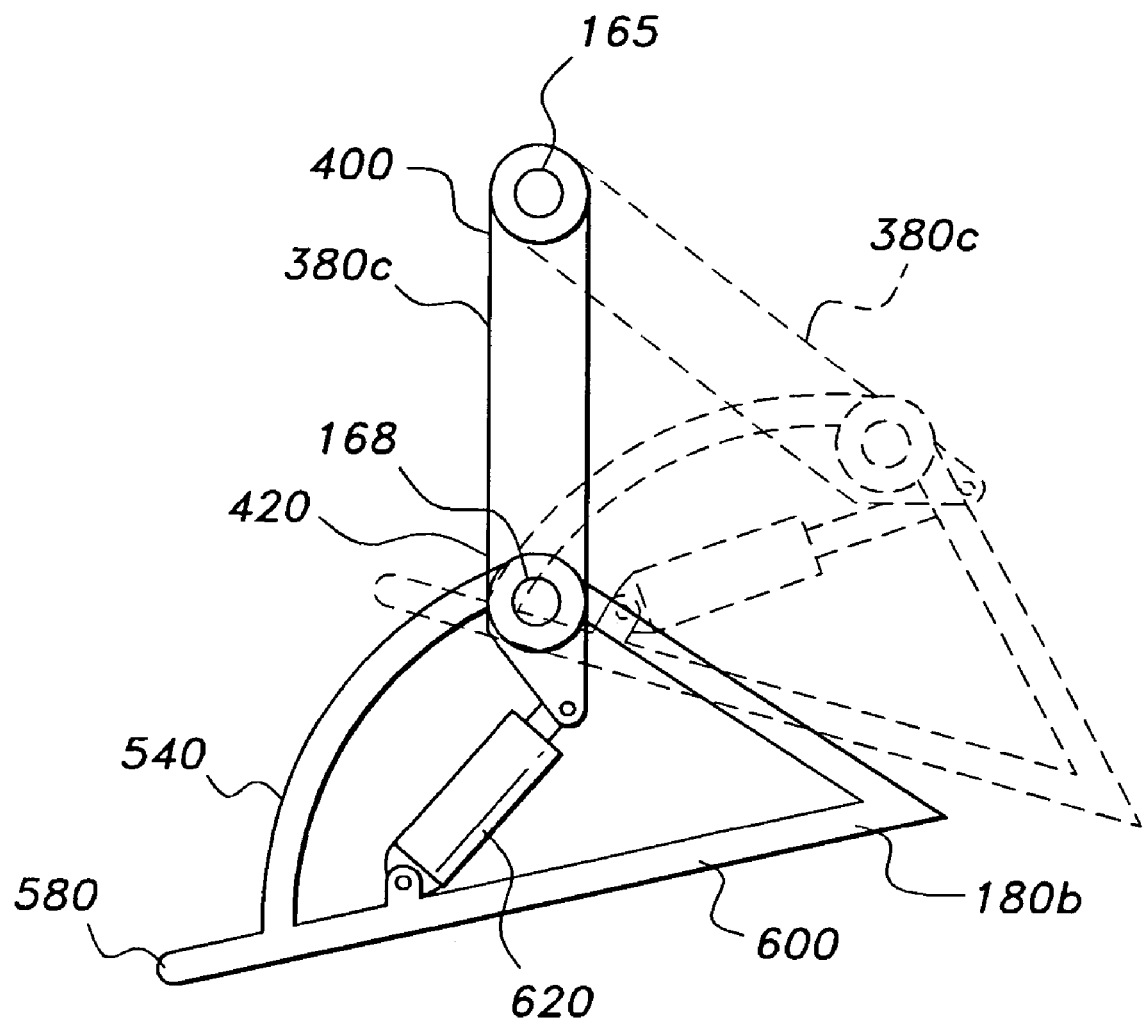
FIG. 9 shows side view of a further embodiment of the carry member according to the present invention.

FIG. 9 is another embodiment of the carry member 180 (represented by the alpha-numeric label "180b"). The carry member 180b comprises a damper shock 620 that helps to dampen tilt movements of the carry member 180b. The damper shock 620 is shown connected between an extended swing-arm 380c and the bottom 600 of the carry member 180. Thus, the exact form of the carry member 180 can vary; any type of carry member 180 can be employed providing the member 180 is pivotally attached to a support frame in such a manner that the carry member 180 can tilt and perform a downstream swinging action.

It should be understood that support frame 160 is not limited to a particular shape and can vary in structure. For example, in FIG. 10 support frame 160 (represented by alpha-numeral "160b") takes the form of a single generally elongated structure with ends 162 and 164. End 162 includes a hollow bore to accommodate shaft 167 as shown in FIG. 11, which shows a top view of the wind turbine of FIG. 10.

Figure 10:
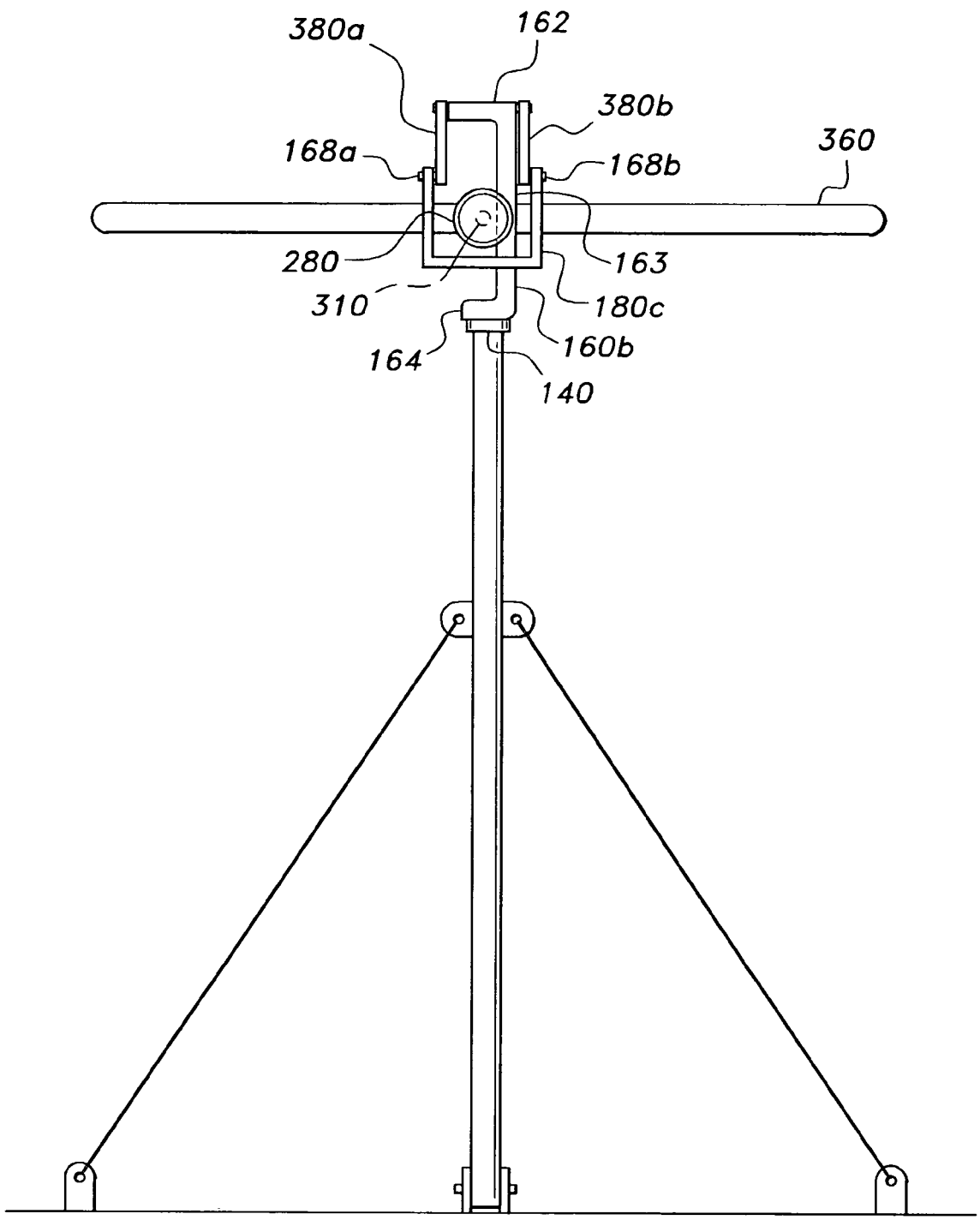
FIG. 10 is a front view of a wind turbine according to the present invention.
Figure 11:
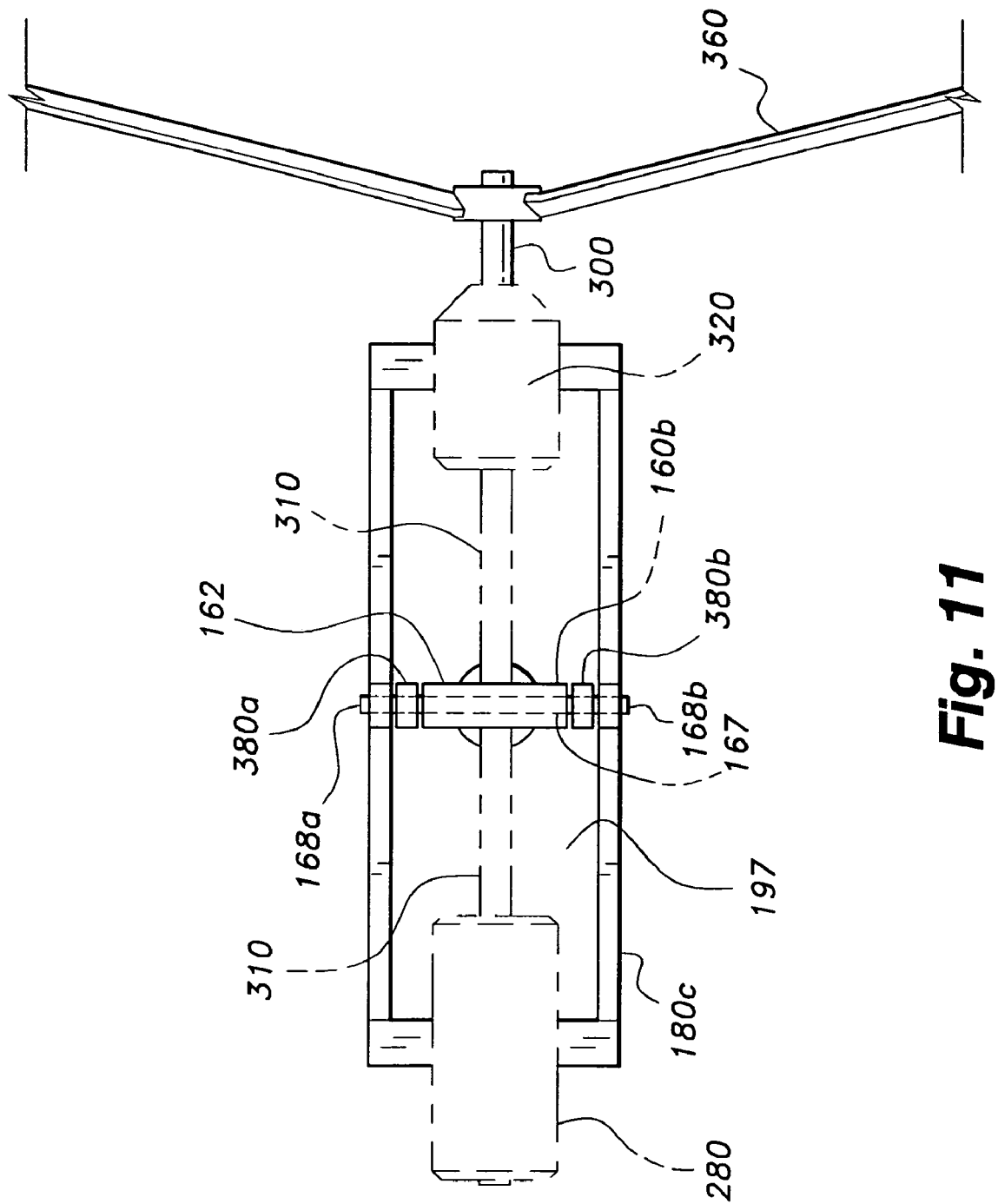
FIG. 11 is a top view of the wind turbine of FIG. 10.

The support frame 160*b* sits inside a modified version of carrier 180 ((represented by alpha-numeral "180*c*" in FIGS. 10 and 11). Carrier member 180*c* comprises a structure that defines an empty central portion 197. Support frame 160*b* sits in the empty central portion 197 such that the carrier 180*c* can swing freely with respect to the support arm 160*b*; however the dimensions of empty central portion 197 limit the degree of swing of member 180*c*; i.e., the downstream swing angle α must be limited to avoid clashes between the ends of carrier member 180*c* (and components connected to the ends of the carrier member 180*c* such as generator 280) and the support frame 160*b*. In addition, the overall shape of support frame 160*b* is designed to accommodate shaft 310; specifically, support arm 160*b* has a middle portion 163 defined by support arms 162 and 164, middle portion 163 is set back sufficiently to avoid contact with shaft 310 (see FIG. 10). Limiting the downstream swing angle α can be achieved by any suitable means such as limiting the amount of play or stretch in cable 440 (shown in FIG. 2A).

Figure 12:
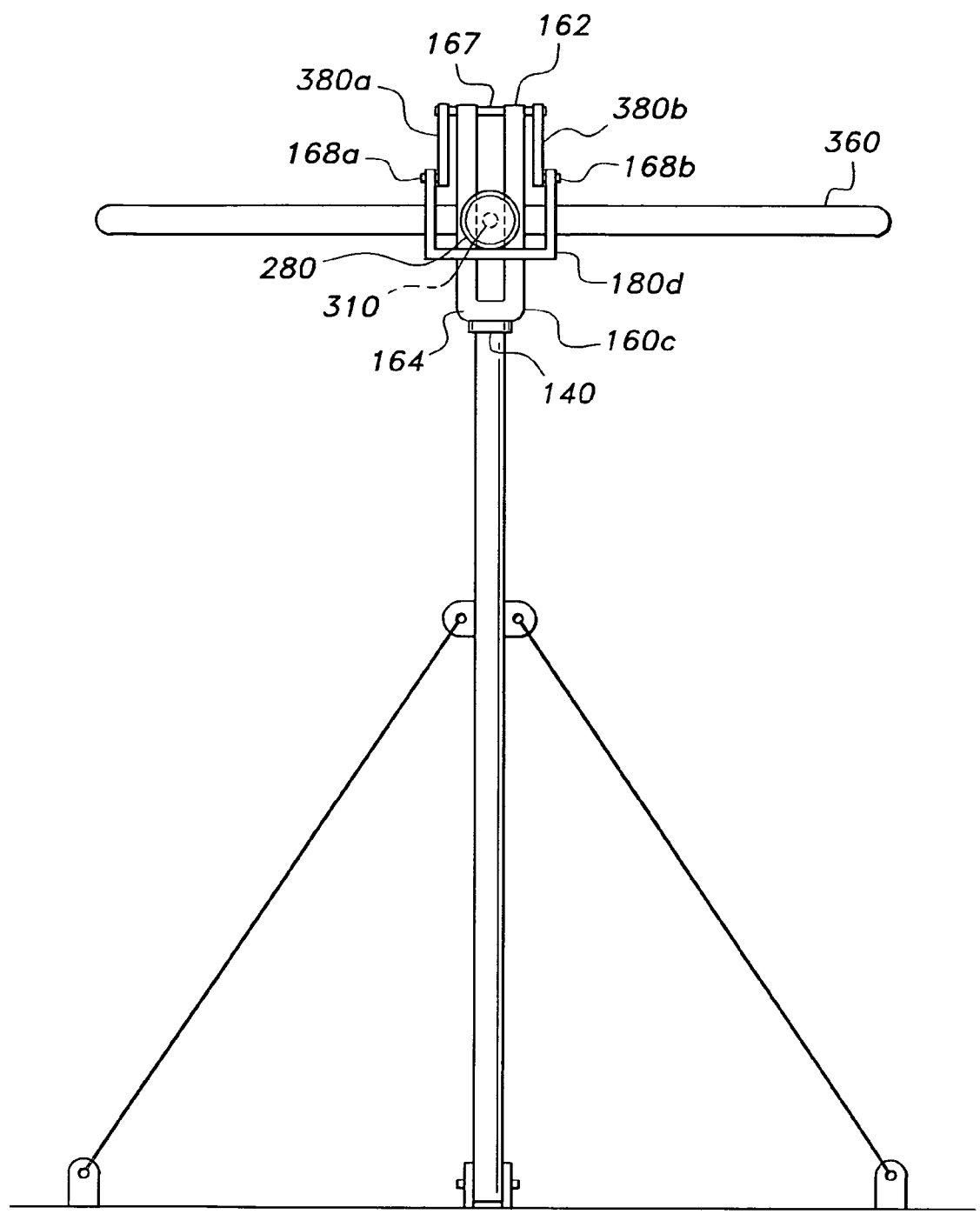
FIG. 12 is a front view of a wind turbine according to the present invention.
Figure 13:
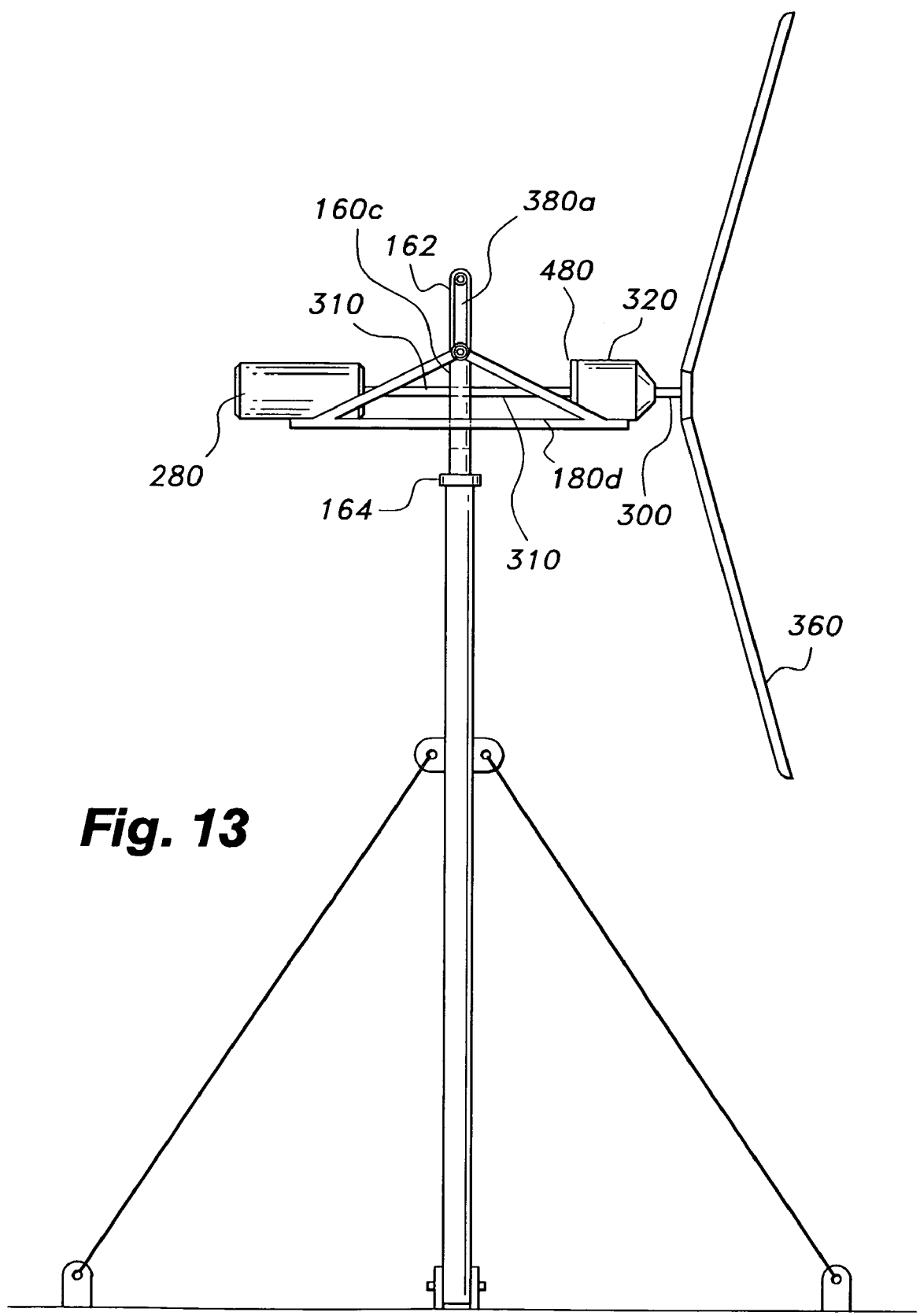
FIG. 13 is a side view of the wind turbine of FIG. 12.

With respect to FIGS. 12 and 13, the support frame 160 is in the form of an upright U-shaped bracket represented by alpha-numeral "160*c*". Support frame 160*c* should be positioned to avoid touching shaft 310. FIG. 13 shows a side-view of the wind turbine of FIG. 12. Carrier member 180 is represented by alpha-numeral "180*d*".

It is to be understood that the present invention is not limited to the embodiments described above, but encompasses any and all embodiments within the scope of the following claims.

I claim:

1. A downstream wind turbine for converting wind energy into electrical energy, comprising:
   a generally vertical support tower;
   a yaw bearing attached to the support tower;
   a support frame having a top and a bottom, wherein the bottom of the support frame is operably linked to the yaw bearing such that the support frame is free to yaw about a horizontal axis;
   at least one swing arm having first and second opposite ends, the first opposite end is pivotally attached to the top of the support frame, wherein the at least one swing arm is free to swing at an angle perpendicular to the support frame;
   an elongated carry member pivotally attached to the second opposite end of the at least one swing arm, wherein the carry member is at least partly accommodated inside the support frame and is orientated at a perpendicular angle with respect to the support frame; and
   a wind driven energy conversion system for generating electricity from wind, the energy conversion system comprising an electric generator, a power shaft, a transmission system and a rotor head attached to at least two blades, wherein the energy conversion system is balanced on and firmly attached to the carry member so that the carry member is biased to maintain an approximately horizontal orientation with respect to the support frame and in response to wind incident on the blades proportionally swings downstream from the support frame.

2. The downstream wind turbine of claim 1 further comprising:
   a governor device for modifying at least one dynamic characteristic of the downstream wind turbine; and
   a means for measuring the amount of downstream swing experienced by the carry member and simultaneously or nearly simultaneously transmitting this information to the governor device for modifying at least one dynamic characteristic of the downstream wind turbine.

3. The downstream wind turbine of claim 2, wherein the governor device is selected from the group consisting of: a blade pitch regulator, a braking device, a blade tip pitch control device.

4. The downstream wind turbine of claim 2, wherein the governor device is a blade pitch regulator.

5. The downstream wind turbine of claim 2, wherein the carry member comprises a curved glide in operable contact with a roller.

6. The downstream wind turbine of claim 2, wherein the carry member comprises a curved glide in operable contact with a roller, and a stop in the form of an extension of the bottom of the carry member to prevent over-tilting of the carry member.

7. A downstream wind turbine for converting wind energy into electrical energy, comprising:
   a generally vertical support tower;
   a yaw bearing attached to the support tower;
   a support frame having a top and a bottom, wherein the bottom of the support frame is operably linked to the yaw bearing such that the support frame is free to yaw about a horizontal axis;
   at least one swing arm having first and second opposite ends, the first opposite end is pivotally attached to the top of the support frame, wherein the at least one swing arm is free to swing at an angle perpendicular to the support frame;
   an elongated carry member pivotally attached to the second opposite end of the at least one swing arm, wherein the carry member is at least partly accommodated inside the support frame and is orientated at a perpendicular angle with respect to the support frame;
   a wind driven energy conversion system for generating electricity from wind, the energy conversion system comprising an electric generator, a power shaft, a transmission system and a rotor head attached to at least two blades, wherein the energy conversion system is balanced on and firmly attached to the carry member so that the carry member is biased to maintain an approximately horizontal orientation with respect to the support frame and in response to wind incident on the blades proportionally swings downstream from the support frame;
   a governor device for modifying at least one dynamic characteristic of the downstream wind turbine; and
   a means for measuring the amount of downstream swing experienced by the carry member and simultaneously or nearly simultaneously transmitting this information to the governor device for modifying at least one dynamic characteristic of the downstream wind turbine.

8. The downstream wind turbine of claim 7, wherein the governor device is selected from the group consisting of: a blade pitch regulator, a braking device, and a blade tip pitch control device.

9. The downstream wind turbine of claim 7, wherein the governor device is a blade pitch regulator.

10. The downstream wind turbine of claim 7, wherein the carry member comprises a curved glide in operable contact with a roller.

11. The downstream wind turbine of claim 7, wherein the carry member comprises a curved glide in operable contact with a roller, and a stop in the form of an extension of the bottom of the carry member to prevent over-tilting of the carry member.

12. A downstream wind turbine for converting wind energy into electrical energy, comprising:
- a generally vertical support tower;
- a yaw bearing attached to the support tower;
- a support frame having a top and a bottom, wherein the bottom of the support frame is operably linked to the yaw bearing such that the support frame is free to yaw about a horizontal axis;
- at least one swing arm having first and second opposite ends, the first opposite end is pivotally attached to the top of the support frame, wherein the at least one swing arm is free to swing at an angle perpendicular to the support frame;
- an elongated carry member pivotally attached to the second opposite end of the at least one swing arm, wherein the carry member is at least partly accommodated inside the support frame and is orientated at a perpendicular angle with respect to the support frame;
- a wind driven energy conversion system for generating electricity from wind, the energy conversion system comprising an electric generator, a power shaft, a transmission system and a rotor head attached to at least two blades, wherein the energy conversion system is balanced on and firmly attached to the carry member so that the carry member is biased to maintain an approximately horizontal orientation with respect to the support frame, wherein the elongated carry member is biased to return to an approximately horizontal orientation when acted upon by gyroscopic precession forces;
- a governor device for modifying at least one dynamic characteristic of the downstream wind turbine; and
- a means for measuring the amount of downstream swing experienced by the carry member and simultaneously or nearly simultaneously transmitting this information to the governor device for modifying at least one dynamic characteristic of the downstream wind turbine;
- whereby the carry frame is free to tilt up or down in response to gyroscopic precession forces and further whereby in response to wind incident on the blades the carry member proportionally swings downstream from the support frame.

13. The downstream wind turbine of claim 12, wherein the governor device is selected from the group consisting of: a blade pitch regulator, a braking device, and a blade tip pitch control device.

14. The downstream wind turbine of claim 12, wherein the governor device is a blade pitch regulator.

15. The downstream wind turbine of claim 12, wherein the carry member comprises a curved glide in operable contact with a roller.

16. The downstream wind turbine of claim 12, wherein the carry member comprises a curved glide in operable contact with a roller, and a stop in the form of an extension of the bottom of the carry member to prevent over-tilting of the carry member.

* * * * *